United States Patent [19]

Bradshaw

[11] Patent Number: 5,502,923
[45] Date of Patent: Apr. 2, 1996

[54] HYDROPONIC GROWTH SYSTEMS AND METHODS

[76] Inventor: John A. Bradshaw, 2700 Industrial Ave. #3, Ft. Pierce, Fla. 34946

[21] Appl. No.: 427,810

[22] Filed: Apr. 25, 1995

[51] Int. Cl.$^6$ .................................................. A01G 31/00
[52] U.S. Cl. .................................................. 47/62; 47/63
[58] Field of Search .................... 47/62 C, 62 N, 47/62 E, 62, 82, 63

[56] References Cited

U.S. PATENT DOCUMENTS

| | | | |
|---|---|---|---|
| 2,870,574 | 1/1959 | Sheridan | 47/62 E |
| 4,038,779 | 8/1977 | Roberts, Jr. et al. | 47/62 E |
| 4,399,634 | 8/1983 | O'Hare | 47/63 |
| 4,976,064 | 12/1990 | Julien | 47/63 |
| 5,010,686 | 4/1991 | Rivest | 47/62 |
| 5,394,647 | 3/1995 | Blackford, Jr. | 47/62 |

FOREIGN PATENT DOCUMENTS 0052264  5/1982  European Pat. Off. .............. 47/62
1641230  4/1991  U.S.S.R. ............................ 47/62

Primary Examiner—Terry Lee Melius
Assistant Examiner—Joanne C. Downs
Attorney, Agent, or Firm—Carroll F. Palmer

[57] ABSTRACT

A hydroponics plant growth system basically consists of a circular nutrient supply module, a circular plant prop module, a pump positioned in the supply module to circulate liquid nutrient upwardly into the prop module, and a distributor unit to convey the liquid nutrient from the pump to the prop module and contact it with plant roots. An elongated tube supports the prop module concentrically upon the supply module and provides internal space for the distributor unit. The prop module is a bowl shaped vessel having a bottom, a top joined by an integral side ring, and a capped collar that upturns from the vessel top. Baskets to hold plants extend through openings in the vessel top in a way the plant roots continually receive some nutrient without being immersed therein. A plurality of prop modules can be supported in a vertical column on one supply module so the system can conserve horizontal space and fully utilize vertical space.

12 Claims, 5 Drawing Sheets

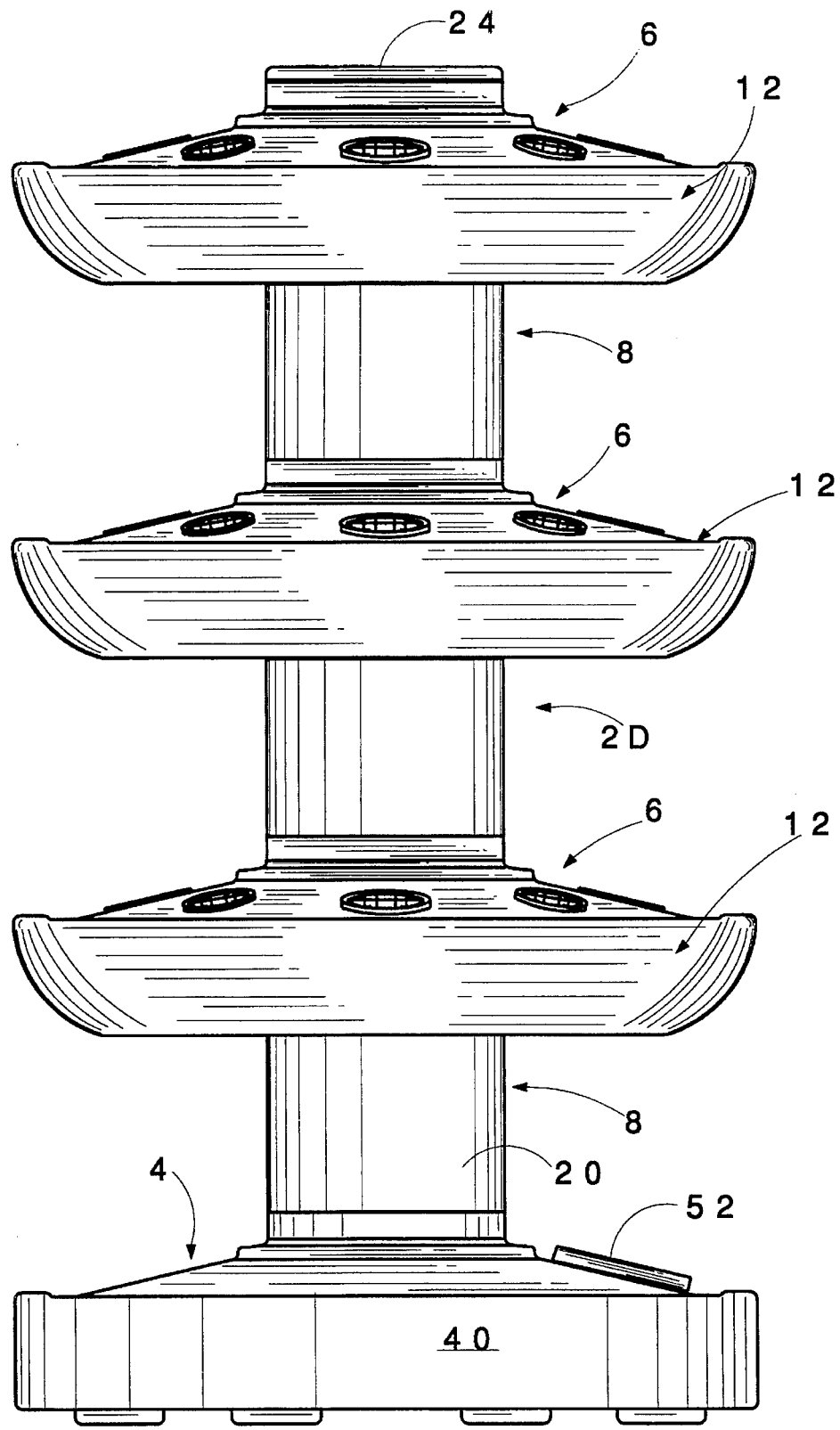
F I G. 7

HYDROPONIC GROWTH SYSTEMS AND METHODS

BACKGROUND OF THE INVENTION

1. Field of the Invention

This application relates to new improvements in hydroponic growth systems and methods. More particularly, it concerns modular units capable of operation in a confined space for the propagation and growth of plants from a self-contained liquid nutrient feed supply.

2. Description of the Prior Art

Many forms of hydroponic apparatus have been developed as shown by U.S. Pat. Nos. 4,218,847; 4,986,027 and 5,287,652 plus the multitude of other U.S. and foreign patents cited in these references. The present invention provides further improvements in this type of apparatus.

OBJECTS

A principal object of the invention is the provision of new improvements in hydroponic growth systems and methods.

Objects of preferred embodiments of the invention include the provision of self-contained hydroponics growth systems that:

1. Occupy a minimum of floor space by a unique design that employs more vertical than horizontal space by the stacking of interconnectable modules.
2. Have a self-contained liquid nutrient feed supply comprising a pump to circulate nutrient powered by photovoltaic cells, DC batteries or AC mains current.
3. Are capable of immersion, drip, spray or combination thereof nutrient flow to plants under cultivation.
4. May have continuous operation for immersion nutrient flow, drip flow or timed flow for spray feed.
5. Contain multiple plant sites capable of being rotated about a central axis for growth modification.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a hydroponic plant growth system which comprises a circular nutrient supply module, a circular plant prop module and tubular means that supports the prop module upon the supply module concentric with a vertical axis common to the supply module and the tubular means.

The prop module comprises a bowl shaped vessel formed as an integral unit by a vessel bottom, a vessel top, a vessel side ring and a vessel collar that upturns concentrically from the vessel top. A cap closes the vessel collar.

The tubular means comprises an elongated tube of datum diameter that depends integrally and concentrically from the vessel bottom. In a preferred embodiment, the vessel bottom is contoured to present a circular weir concentric with the vertical axis positioned between the elongated tube and the vessel side ring thereby creating a liquid reservoir in the vessel bottom.

There is a plurality of openings in the vessel top and baskets extend downward through them so at least the lower portion of the baskets depend into the interior of the vessel. These openings and baskets are advantageously circular in cross-section, but may be square, hexagonal, oval, etc, and each basket is designed to hold one or more plants for hydroponic growth in the system.

The supply module comprises, as an integral combination unit, a support bottom, a support top, a support collar that upturns from the support top and a support side ring that joins the support top to the support bottom.

The support collar has a diameter equal to the datum diameter and the elongated tube has a lower end portion of diameter slightly less than such datum diameter whereby such lower end portion nests within the support collar enabling the supply module to support the elongated tube and its integral prop module.

Pump means is positioned in the supply module to circulate liquid nutrient from the supply module upwardly into the prop module and there is distributor means to convey the liquid nutrient from the pump means to the prop module and contact it with the baskets.

In preferred embodiments, the distributor means comprises a spray unit positioned in the prop module and conduit means connects the pump means with the spray unit for transfer of liquid nutrient from the pump means to the spray unit In a second embodiment of the system, the prop module contains a retainer member formed with an upper tubular section having a diameter greater than the datum diameter, a lower tubular section having a diameter less than the datum diameter and a shoulder section integrally joining the upper tubular section to the lower tubular section. The retainer member is supported concentrically within the prop module by its shoulder section.

BRIEF DESCRIPTION OF THE DRAWINGS

A more complete understanding of the invention can be obtained by reference to the accompanying drawings in which:

FIG. 7 is a lateral view of another embodiment.

DESCRIPTION OF THE PREFERRED EMBODIMENTS

Figure 1:
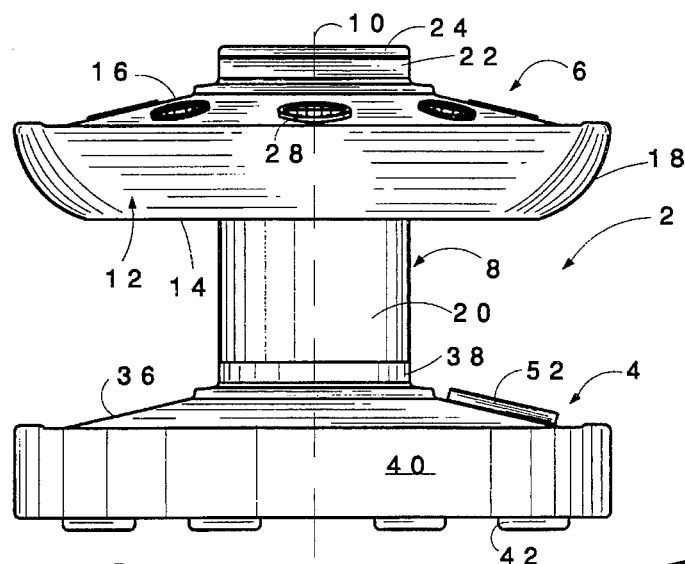
FIG. 1 is lateral view of a hydroponic growth system of the invention.

For a detailed description of the invention, reference is made to the drawings in which generic parts of the illustrated matter are indicated by a arrowhead line associated with the designation numeral and specific parts are indicated by plain lines associated with the numerals.

Referring in detail to the drawings, the hydroponics plant growth system 2 comprises a circular nutrient supply module 4, a circular plant prop module 6 and tubular means 8 that supports the module 6 upon module 4 concentric with vertical axis 10.

Module 8 is a bowl shaped vessel 12 with a bottom 14, top 16 and integral side ring 18.

Tubular means 8 comprises elongated tube 20 of datum diameter D that depends integrally and concentrically from the bottom 14.

Vessel collar 22 upturns integrally and concentrically from the vessel top 16 and cap 24 closes the collar 22.

Openings 26 in top 16 receive the baskets 28 so at least the lower portions 30 thereof depend into the interior 31 of the vessel 12.

Module 4 is an integral unit formed of bottom 34, top 36, collar 38 and side ring 40. Module 4 includes support pads 42, vent tube 44 that connects the module interior 46 with the ambient via opening 48 in bottom 34 and hatch 50 capped with the closure 52.

Pump unit 54 is positioned in the module 4 to circulate liquid nutrient (not shown) from the interior 46 of module 4 upwardly into the module 6 via distributor means 56 comprising conduit 58 and spray unit 60 to convey the liquid nutrient into the module 6 and contact it with the baskets 28. Pump unit 54 may be a commercially available type powered by photovoltaic cells, DC batteries or AC mains current and conduit 58 is advantageously of a telescoping type that may be adjusted in length to fine tune the position of spray unit 60 relative to the baskets 28.

The module 6 is independent of, but supported by, module 4 so the two are easily separated and module 6 can also be rotated relative to module 4. Such rotation is made possible by constructing collar 38 with a diameter equal to D and making the lower end portion 62 of elongated tube 20 have a slightly smaller diameter so lower end portion 62 can nest within support collar 38 whereby the module 4 can support elongated tube 20 and the integral prop module 6. In order to strengthen the lower end of tube 20, a transverse circular web 64 is formed integral with the tube 20 and this web 64 is provided with a concentric, central opening 66 to accommodate the conduit 58.

Figure 3:
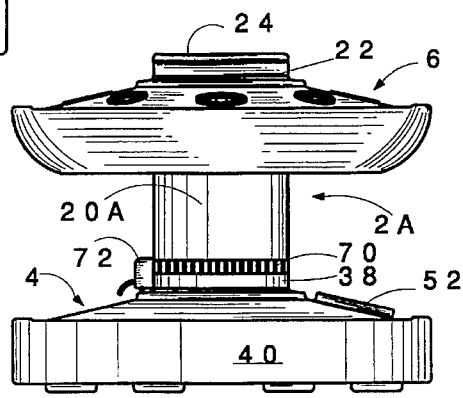
FIG. 3 is reduced size lateral view of a modification of the hydroponic growth system shown in FIG. 1.
Figure 2:
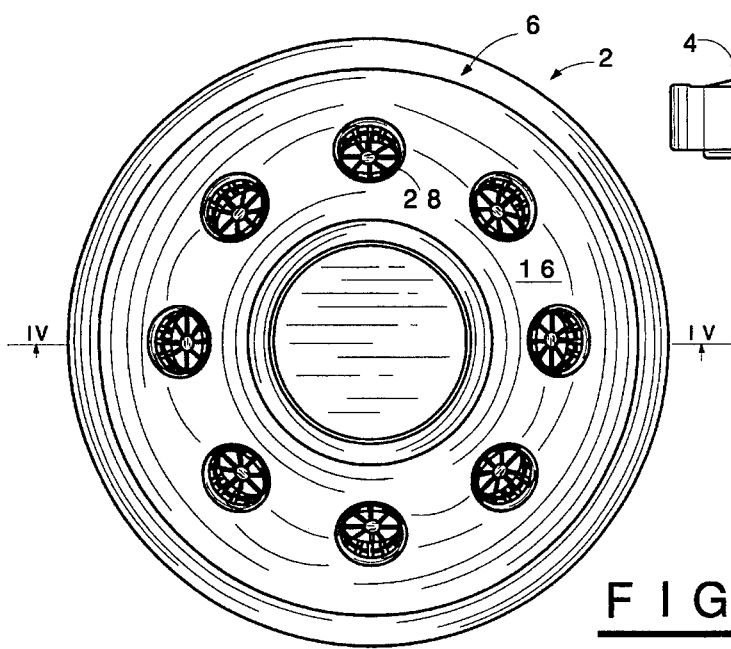
FIG. 2 is a plan view of the hydroponic growth system shown in FIG. 1.
Figure 4:
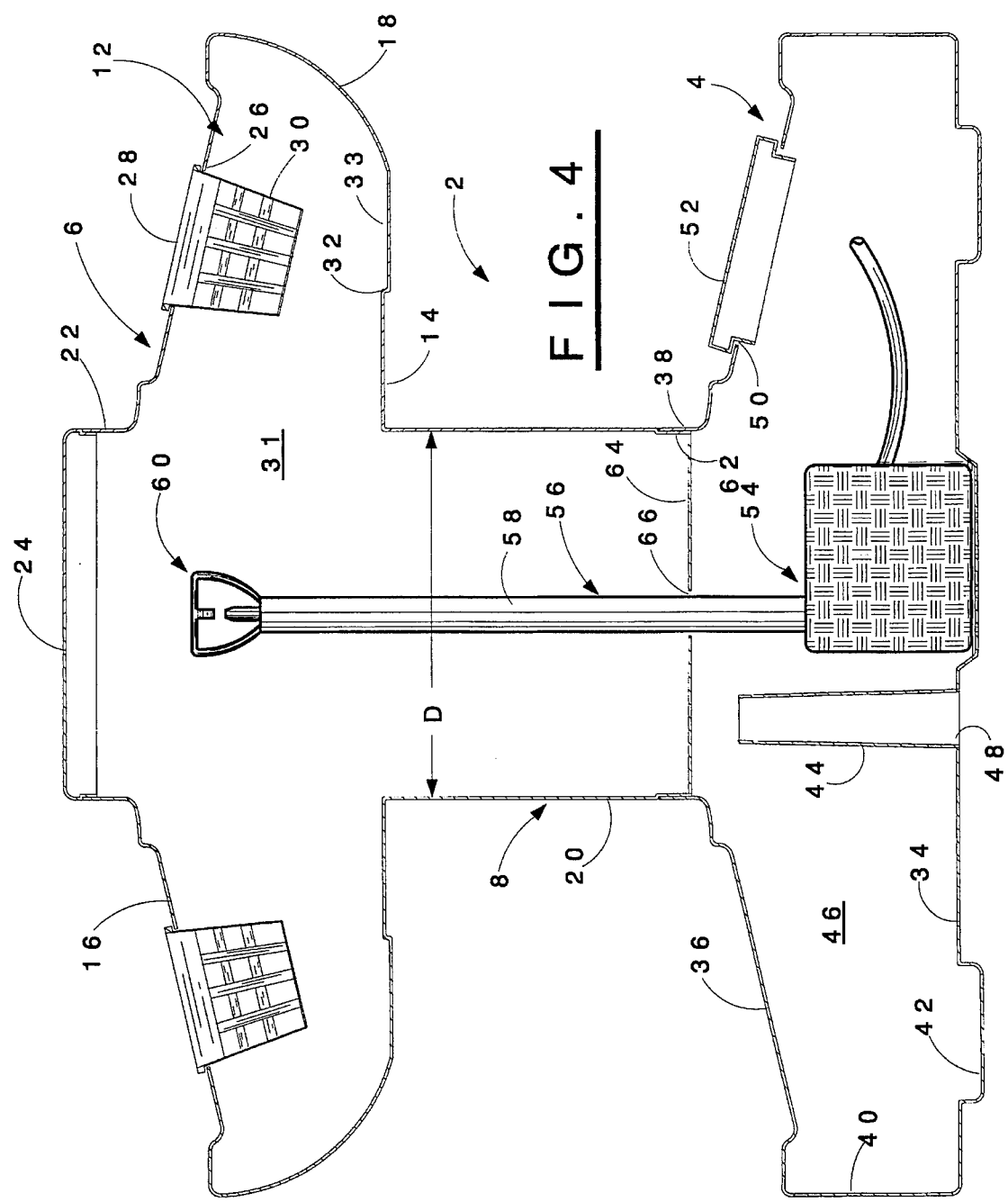
FIG. 4 is an enlarged lateral sectional taken on the line IV—IV of FIG. 2.

The modified hydroponics plant growth system 2A of FIG. 3 differs from system 2 because the elongated tube 20A is provided with a strip of peripheral gear teeth 70 that intermesh with drive motor 72 for rotation of it and the prop module 6A. When combined with UV lighting, such motorized rotation of the prop modules can be effectively employed with planned modification of plant growth cycles.

Figure 5:
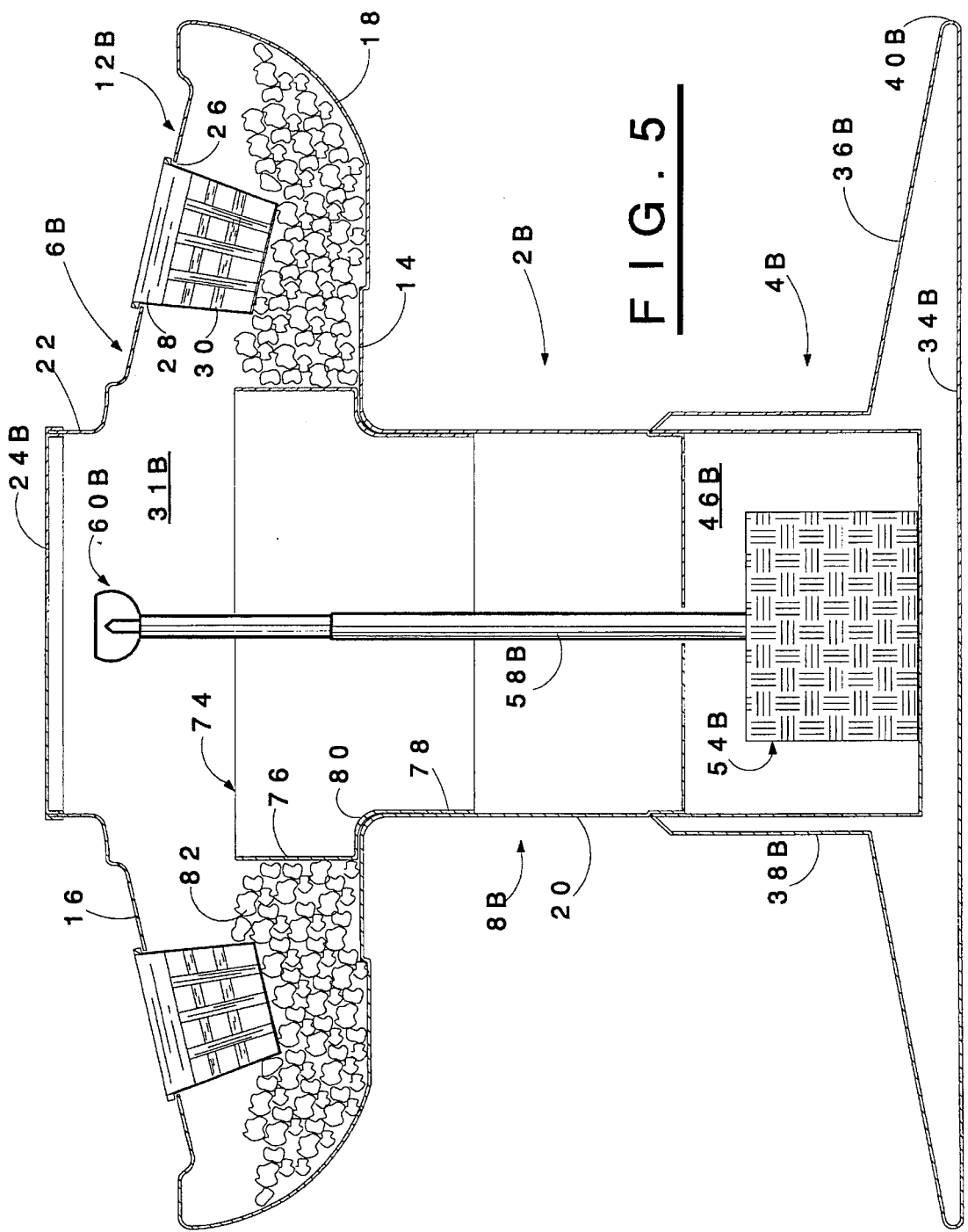
FIG. 5 is a lateral sectional view similar to FIG. 4 of another embodiment of hydroponic growth system of the invention.

In the embodiment shown in FIG. 5, the hydroponics plant growth system 2B comprises a circular nutrient supply module 4B, a circular plant prop module 6A and tubular means 8B.

Module 6B is a bowl shaped vessel 12B with a bottom 14, top 16 and integral side ring 18.

Tubular means 8B comprises elongated tube 20 of datum diameter D that depends integrally and concentrically from the bottom 14.

Vessel collar 22 upturns integrally and concentrically from the vessel top 16 and cap 24B closes the collar 22.

Openings 26 in top 16 receive the baskets 28 so at least their lower portions 30 depend into the interior 31B of the vessel 12B.

Prop module 8B comprises a retainer member 74 having an upper tubular section 76, a lower tubular section 78 and a shoulder section 80. As shown, the retainer member 74 is supported concentrically within prop module 6B by the shoulder section 80.

Granular material 82 is contained in prop module 6B supported on vessel bottom 14 and confined inwardly of side ring 18 by the retainer member 74 to serve as an accumulator for liquid nutrient (not shown) passed into the vessel 12B from the supply module 4B.

Module 4B is an integral unit formed of bottom 34B, top 36B, collar 38B and side ring 40B.

Pump unit 54B, operated by batteries (not shown), is positioned in the module 4B to circulate liquid nutrient (not shown) from the interior 46B of module 4B upwardly into the module 6B via distributor means 56B comprising telescoping conduit 58B and spray unit 60B to convey the liquid nutrient into the module 6B and contact it with the baskets 28.

Figure 6:
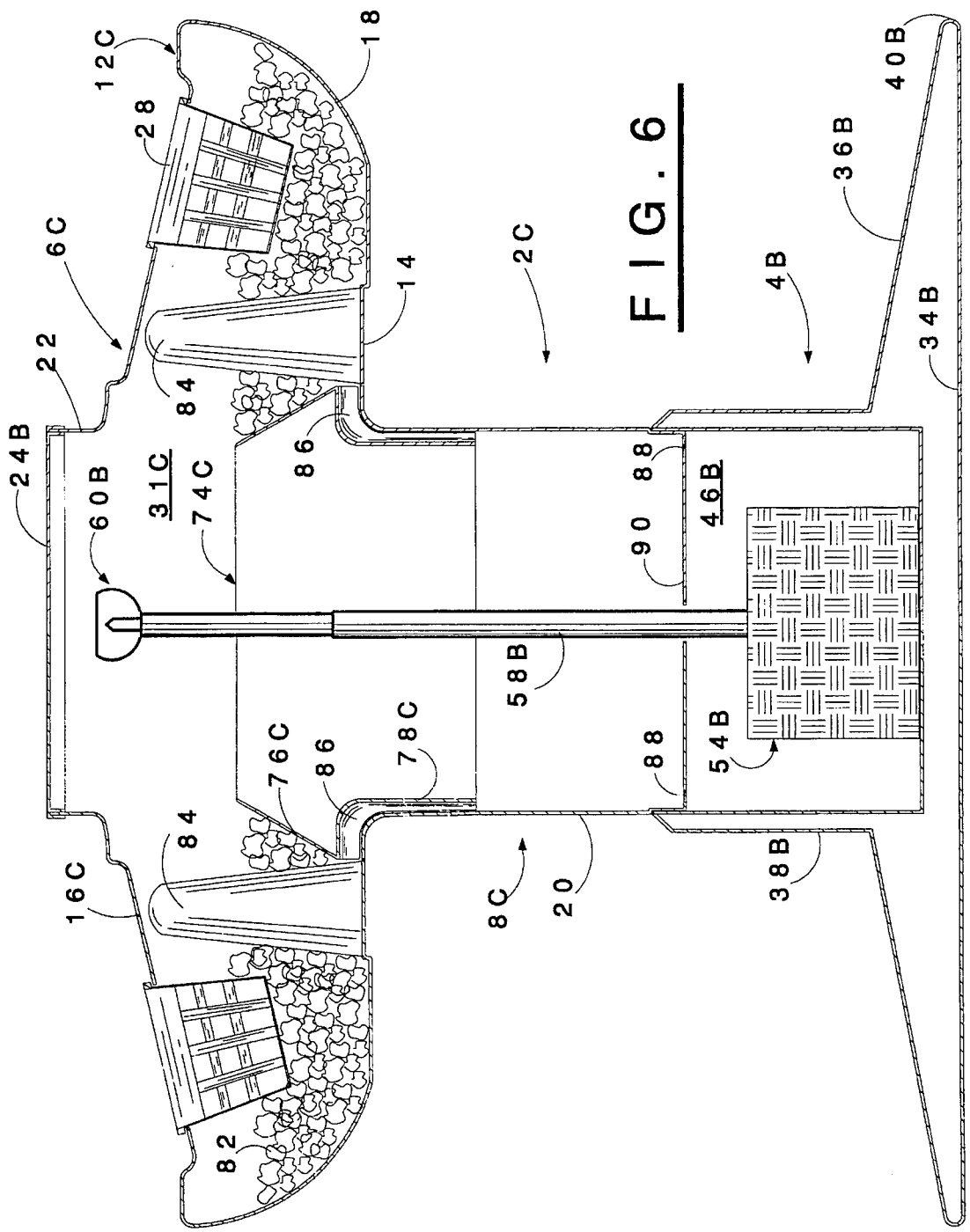
FIG. 6 is a lateral view of a stacked version of a hydroponic growth system of the invention.

The hydroponics plant growth system 2C shown in FIG. 6 is similar to system 2B, but includes pillars 84 positioned in the interior 31C of module 6C to help support the top 16C from bowing downward when weight is imposed thereon. In order to accommodate the pillars 84, the baskets 28 are moved further out from the central axis in the bowl shaped vessel 12C. Also, the upper section 76C of the retainer member 74C is angled inwardly and the lower tubular section 78C has gutters 86 molded therein to assist in drainage of liquid from the module 6C into tubular means 20 of prop module 8C and thence through holes 88 formed in base 90 to flow finally into the interior 46B of the module 4B.

In the embodiment shown in FIG. 7, the hydroponics plant growth system 2D comprises three identical prop modules 6 supported by a single supply module 4. It will be apparent that the unique construction of the modules 4 & 6 make it possible to utilize vertical space to cultivate double or triple numbers of plantings without need for additional horizontal space which is a valuable feature when growth systems of the invention are used in small apartments, balcony areas or the like.

The growth of plants with systems 2, 2A, 2B, 2C or 2D of the invention is easily and effectively conducted with all plants capable of being grown hydroponically. For example with system 2, liquid nutrient material is charged into module 4 to a suitable level below the top of vent tube 44 through the hatch 50 which is then closed by the closure 52. Plants are appropriately placed in baskets 28 that are then installed in openings 26 of the prop module 6. The pump means 54 is then actuated to pump the liquid nutrient up conduit 58 to spray from spray head 60 so that some part of it will contact the lower part 30 of baskets 28 and all of it will fall to the bottom 14. With continued pumping, some liquid nutrient will always remain in the reservoir 33 behind weir 32 while the rest will flow across bottom 14 to fall through the tube 20 back into the interior 46 of module 4 for where it will be recirculated back up into the interior 31 of module 6.

Typically, the circulation of liquid nutrient by pump means 54 will not be continual, i.e., it will be controlled to provide periods of no circulation. During such periods, the liquid nutrient retained in reservoir 33 will serve to provide the plants held in baskets 28 with proper humidity and other conditions needed to produce efficient growth. Of course, the operation of system 2C will mimic that of system 2 except many more plants will be cultivated on the same floor space than with system 2.

The growth of plants in system 2A will be like with system 2, except that continual or intermittent powered rotation of module 6A will provide plants contained in its baskets 28 to varying exposure to an asymmetric source (not shown) to enable controlled growth modification. Of course, this can be obtained with more effort using system 2 by manual rotation of module 6.

The growth of plants in system 2B varies from that of system 2 only in the manner in which liquid nutrient accesses plants in the baskets 28. Thus, instead of liquid nutrient being only held in reservoir 33, considerable nutrient is retained by the granular material 82 for exposure to the roots of plants (not shown) contained in the baskets 28, i.e., growth in system 2B emulates so-called immersion nutrient flow as opposed to the drip flow type operation of system 2.

The embodiments of the invention in which an exclusive property or privilege is claimed are defined as follows:

1. A hydroponics plant growth system which comprises:

a circular nutrient supply module, a circular plant prop module and tubular means that supports said prop module upon said supply module concentric with a vertical axis common to said supply module and said tubular means, said prop module comprising a bowl shaped vessel defined by a vessel bottom and a vessel top joined by an integral vessel side ring, said tubular means comprising an elongated tube of datum diameter that depends integrally and concentrically from said vessel bottom, a vessel collar that upturns integrally and concentrically from said vessel top, a cap for closing said vessel collar, a plurality of openings in said vessel top, baskets received by said openings so at least the lower portion of said baskets depend into the interior of said vessel, said supply module comprising in an integral unit a support bottom, a support collar and a support side ring, pump means positioned in said supply module to circulate liquid nutrient from said supply module upwardly into said prop module, and distributor means to convey said liquid nutrient from said pump means to said prop module and contact it with said baskets.

2. The hydroponics plant growth system of claim 1 wherein said distributor means comprises a spray unit positioned in said prop module and conduit means connecting said pump means with said spray unit for transfer of liquid nutrient from said pump means to said spray unit.

3. The hydroponics plant growth system of claim 2 wherein said plant prop module is capable of rotation relative to said nutrient supply module.

4. The hydroponics plant growth system of claim 3 wherein said elongated tube is geared for rotation of said elongated tube and said prop module.

5. The hydroponics plant growth system of claim 1 wherein said vessel bottom is contoured to present a circular weir concentric with said vertical axis positioned between said elongated tube and said vessel side ring thereby creating a liquid reservoir in said vessel bottom.

6. The hydroponics plant growth system of claim 1 wherein said prop module comprises a retainer member defined by an upper tubular section having a diameter greater than said datum diameter, a lower tubular section having a diameter less than said datum diameter and a shoulder section integrally joining said upper tubular section to said lower tubular section, said retainer member being supported concentrically within said prop module by said shoulder section.

7. A hydroponics plant growth system which comprises:

a circular nutrient supply module, a circular plant prop module and tubular means that supports said prop module upon said supply module concentric with a vertical axis common to said supply module and said tubular means, said prop module comprising a bowl shaped vessel defined by a vessel bottom and a vessel top joined by an integral vessel side ring, said vessel bottom being contoured to present a circular weir concentric with said vertical axis positioned between said elongated tube and said vessel side ring thereby creating a liquid reservoir in said vessel bottom, said tubular means comprising an elongated tube of datum diameter that depends integrally and concentrically from said vessel bottom, a vessel collar that upturns integrally and concentrically from said vessel top, a cap for closing said vessel collar, a plurality of openings in said vessel top, baskets received by said openings so at least the lower portion of said baskets depend into the interior of said vessel, said supply module comprising a support bottom, a support collar and a support side ring that integrally joins said support collar to said support bottom, said support collar having a diameter equal to said datum diameter and said elongated tube having a lower end portion of slightly less than said datum diameter whereby said lower end portion can nest within said support collar enabling said supply module to support said elongated tube and the integral prop module, pump means positioned in said supply module to circulate liquid nutrient from said supply module upwardly into said prop module, and distributor means to convey said liquid nutrient from said pump means to said prop module and contact it with said baskets.

8. The hydroponics plant growth system of claim 7 wherein said supply module includes a vertical vent tube that connects the interior of said supply module with the ambient via said support bottom.

9. The hydroponics plant growth system of claim 7 wherein said supply module includes a capped hatch.

10. A hydroponics plant growth system which comprises:

a circular nutrient supply module, a circular plant prop module and tubular means that supports said prop module upon said supply module concentric with a vertical axis common to said supply module and said tubular means, said prop module comprising a bowl shaped vessel defined by a vessel bottom and a vessel top joined by an integral vessel side ring, said tubular means comprising an elongated tube of datum diameter that depends integrally and concentrically from said vessel bottom, a vessel collar that upturns integrally and concentrically from said vessel top, a cap for closing said vessel collar, a plurality of openings in said vessel top, baskets received by said openings so at least the lower portion of said baskets depend into the interior of said vessel, said supply module comprising in an integral unit a support bottom, a support collar and a support side ring, said support collar having a diameter equal to said datum diameter and said elongated tube having a lower end portion of diameter slightly less than said datum diameter whereby said lower end portion nests within said support collar enabling said supply module to support said elongated tube and the integral prop module, a retainer member defined by an upper tubular section having a diameter greater than said datum diameter, a lower tubular section having a diameter less than said datum diameter and a shoulder section integrally joining said upper tubular section to said lower tubular section, said retainer member being supported concentrically within said prop module by said shoulder section, pump means positioned in said supply module to circulate liquid nutrient from said supply module upwardly into said prop module, and distributor means to convey said liquid nutrient from said pump means to said prop module and contact it with said baskets.

11. The hydroponics plant growth system of claim 10 wherein granular material contained in said prop module is supported on said vessel bottom and confined inwardly of said vessel side ring by said retainer member.

12. The hydroponics plant growth system of claim 10 wherein said bowl shaped vessel comprises pillars formed integral with said vessel bottom to assist in the support of said vessel top against downward bowing thereof when weight is imposed thereon.

\* \* \* \* \*